April 7, 1959 — E. V. BRYANT — 2,880,535
SAFETY EMBLEM
Filed Oct. 17, 1956
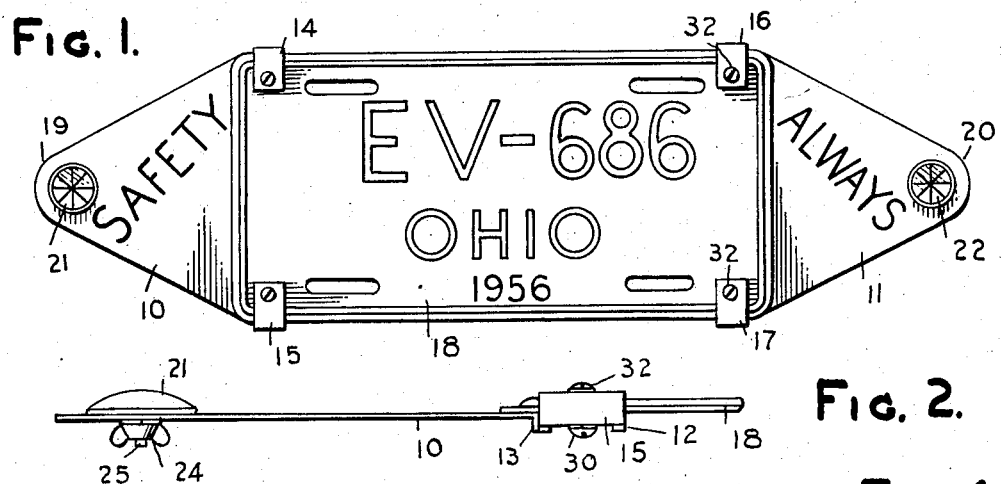
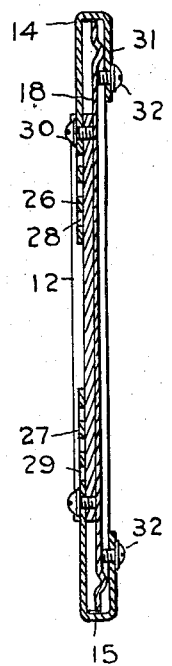
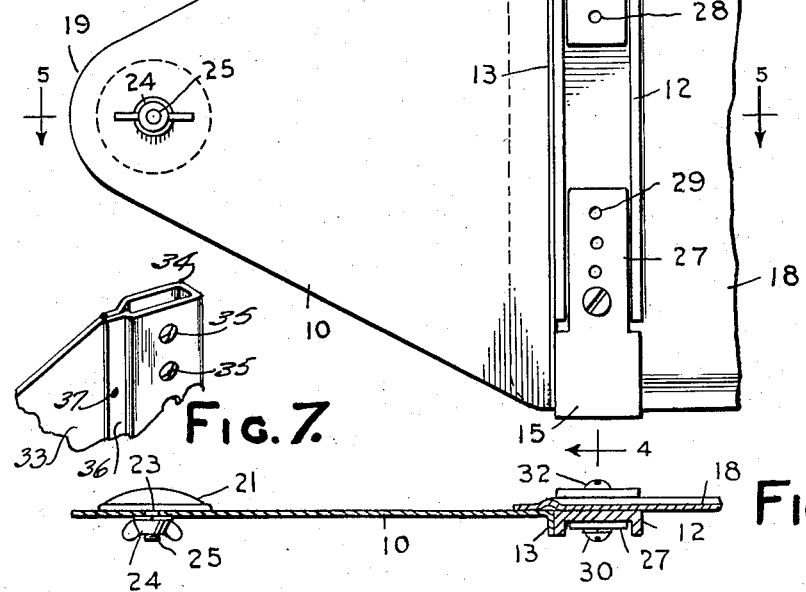
INVENTOR.
EDMOND V. BRYANT
BY Victor J. Evans & Co.
ATTORNEYS

United States Patent Office 2,880,535
Patented Apr. 7, 1959

2,880,535

SAFETY EMBLEM

Edmond V. Bryant, Cleveland, Ohio

Application October 17, 1956, Serial No. 616,557

4 Claims. (Cl. 40—125)

This invention relates to motor vehicles and particularly frames or holders for slogans, emblems, and the like adapted to be positioned on outer surfaces of vehicles or on license plates of vehicles, and in particular a pair of triangular-shaped plates having reflectors on extended ends carrying words of a slogan, and mechanical fastening devices adapted to clamp the triangular-shaped plates on the ends of the license plates or on conventional chrome plated cover frames of license plates of a motor vehicle whereby a safety slogan is continuously displayed in combination with the license plate of the vehicle.

The purpose of this invention is to provide means for applying a safety slogan to a motor vehicle without permanently attaching the mechanical elements to the body of the vehicle.

Various types of frames have been provided for license plates of motor vehicles and openings for names of cities, towns, or other indicia have been provided in combination with the frames; and various types of display devices have been provided for safety slogans, however, it is difficult to apply such devices to motor vehicles without drilling holes in the wall surfaces of the vehicles or without making permanent attachments thereto. In reselling motor vehicles attachments applied to the surface of the vehicles are detrimental and the sales value of such vehicles is compartively low. With this thought in mind this invention contemplates a method of attaching a safety slogan to a vehicle without marring the outer surface of the vehicle body or parts thereof.

The object of this invention is, therefore, to provide plates for safety slogans for use on motor vehicles wherein the plates are adapted to be attached to conventional license plates of the vehicle.

Another object of the invention is to provide means for attaching a safety slogan to a motor vehicle without drilling holes in the body of the vehicle and in which the slogans are displayed continuously, and are readily legible.

A further object of the invention is to provide a safety slogan attaching device for a motor vehicle in which the device is of a simple and economical construction.

With these and other objects and advantages in view the invention embodies a pair of triangular-shaped plates having conventional reflectors on extended ends with U-shaped clamps having adjusting screws therein adjustably mounted on bars secured to inner edges of the plates and positioned to extend over upper and lower edges of a license plate.

Other features and advantages of the invention will appear from the following description taken in connection with the drawing, wherein:

Figure 1 is an elevational view showing a license plate with safety slogan carrying plates clamped on opposite ends thereof.

Figure 2 is a view looking upwardly toward the lower edge of one end of a license plate showing a safety slogan carrying plate clamped to the end thereof and with the parts on an enlarged scale.

Figure 3 is a rear elevational view looking toward the back of the device and also showing the parts on an enlarged scale.

Figure 4 is a cross section taken on line 4—4 of Fig. 3 showing the clamping elements for attaching one of the safety slogan carrying plates to the end of a license plate.

Figure 5 is a sectional plan taken on line 5—5 of Fig. 3 also showing a safety slogan carrying plate attached to the end of a license plate.

Figure 6 is a longitudinal section through one side of the emblem showing a modification wherein a channel on the inner end of one of the plates in which shanks of the mounting clamps are positioned.

Figure 7 is a perspective view illustrating the channel formation on the inner end of one of the reflector plates.

Referring now to the drawing wherein like reference characters denote corresponding parts the improved safety slogan attachment of this invention includes triangular-shaped plates 10 and 11, bars 12, channel-shaped in cross section secured to flanges 13, such as by welding, on inner edges of the plates 10 and 11 and U-shaped clamps 14 and 15 on the bar of the plate 10 and 16 and 17 on the bar of the plate 11, the clamps being positioned to extend over upper and lower edges of the ends of a license plate 18 adapted to be mounted on a vehicle by conventional means.

The extended ends of the plates 10 and 11 are provided with arcuate surfaces 19 and 20 and reflectors 21 and 22 spaced inwardly from the ends of the plates are secured in openings 23 of the plates by wing nuts 24 that are threaded on threads 25 extended from the reflectors through the openings 23. By this means the reflectors may be removed and replaced as desired.

The clamps for supporting the plates 10 and 11 on the ends of the license plate 18 are provided with tongues, such as the tongues 26 and 27, the tongues being provided with spaced openings 28 and 29 through which screws 30, which are threaded in the bars 12, extend.

With the screws 30 inserted through the spaced openings 28 and 29 the clips are adapted to be adjusted to compensate for license plates of different sizes and with the extended ends, such as the ends 31 of the clips provided with screws 32 the plates 10 and 11 may be rigidly clamped in position on license plates.

With the parts provided as illustrated and described different slogans, such as Safety Always, Speed Kills, Watch Hills, Liquor Kills, Keep Lane, Drive OK., Don't Poke, Don't Weave, Don't Gawk, Don't Sleep, Don't Cut-In, Safely Home, may be displayed on the plates.

In the modification shown in Fig. 6 a plate 33 similar to the plates 10 and 11, is formed with a channel bar 34 on the inner edge and the tongues 26 and 27 are secured in the channel bar by the bolts 30, that are positioned in openings 35. Flanges 36 at the inner sides of the channels are secured to the plate 33 by spot welding as shown at the points 37.

The slogans may be provided on adhesive stickers so that one slogan may be placed over another whereby the slogans may be changed as desired and with the slogans in position upon the plates the plates may readily be mounted on a license plate or on a frame providing a holder for a license plate by sliding the clamps over ends of the plates or frames and tightening the screws as shown and described.

The emblem plates may be formed of metal, plastic or other suitable material, and, as an illustration, the reflective or glowing lettering, visible at night, may be red on the plates at the rear, and amber or green on plates at the front.

By making the device so that it is installed and changed by drivers or operators of vehicles, the operators are made conscious of the slogans and more safe driving is promoted thereby.

It will be understood that modifications, within the scope of the appended claims, may be made in the design and arrangement of the parts without departing from the spirit of the invention.

What is claimed is:

1. A safety slogan plate comprising a triangular-shaped body having a reflector on an extended end, a mounting bar positioned on the edge of the body opposite to the point on which the reflector is positioned and U-shaped clamps adjustably mounted on the ends of the bar, the clamps being formed to attach the body to an end of a motor vehicle license plate.

2. A safety slogan attachment for license plates of motor vehicles, the combination which comprises a pair of triangular-shaped plates positioned with one of the edges thereof corresponding to end edges of a license plate and with vertexes thereof extended from the license plate, bars, channel-shaped in cross section positioned on the edges of the plates corresponding with the ends of the license plate, and U-shaped clamps adjustably mounted on the bars and positioned to extend over upper and lower edges of a license plate.

3. A safety slogan attachment for license plates of motor vehicles, the combination which comprises a pair of triangular-shaped plates positioned with one of the edges thereof corresponding to end edges of a license plate and with vertexes thereof extended from the license plate, bars, channel-shaped in cross section positioned on the edges of the plates corresponding with the ends of the license plate, U-shaped clamps adjustably mounted on the bars and positioned to extend over upper and lower edges of the license plate, adjusting screws positioned in ends of the clamps, and reflectors removably mounted on the vertexes of the plates.

4. A safety slogan attachment for license plates of motor vehicles, the combination which comprises a pair of triangular-shaped plates positioned with one of the edges thereof corresponding to end edges of a license plate and with vertexes thereof extended from the license plate, the inner edges of the plates having channel bars thereon, U-shaped clamps adjustably mounted on the channel bars and positioned to extend over the upper and lower portions of the license plate, adjusting screws positioned in ends of the clamps, and reflectors removably mounted on the vertexes of the plates.

References Cited in the file of this patent

UNITED STATES PATENTS

| | | |
|---|---|---|
| 1,269,923 | Gathright | June 18, 1918 |
| 1,303,834 | Ward et al. | May 13, 1919 |
| 1,553,238 | Hartshorne | Sept. 8, 1925 |
| 1,863,902 | Hanson | June 21, 1932 |
| 2,026,509 | Lampert | Dec. 31, 1935 |
| 2,095,507 | Meadows | Oct. 12, 1937 |